(12) United States Patent
Telfeian

(10) Patent No.: US 12,490,995 B2
(45) Date of Patent: Dec. 9, 2025

(54) LUMBAR FACETECTOMY GUIDE

(71) Applicant: Rhode Island Hospital, Providence, RI (US)

(72) Inventor: Albert Telfeian, Providence, RI (US)

(73) Assignee: Rhode Island Hospital, Providence, RI (US)

(*) Notice: Subject to any disclaimer, the term of this patent is extended or adjusted under 35 U.S.C. 154(b) by 761 days.

(21) Appl. No.: 17/529,635

(22) Filed: Nov. 18, 2021

(65) Prior Publication Data

US 2022/0071645 A1 Mar. 10, 2022

Related U.S. Application Data

(63) Continuation-in-part of application No. PCT/US2021/032536, filed on May 14, 2021.

(51) Int. Cl.
| | | |
|---|---|---|
| *A61B 17/17* | (2006.01) | |
| *A61B 17/16* | (2006.01) | |
| *A61B 34/20* | (2016.01) | |
| *A61B 90/11* | (2016.01) | |
| *A61F 2/30* | (2006.01) | |
| *A61F 2/44* | (2006.01) | |
| *A61F 2/46* | (2006.01) | |

(52) U.S. Cl.
CPC ...... *A61B 17/1757* (2013.01); *A61B 17/1671* (2013.01); *A61B 34/20* (2016.02); *A61B 90/11* (2016.02); *A61F 2/4455* (2013.01); *A61F 2/4611* (2013.01); *A61B 2034/2055* (2016.02); *A61F 2002/30593* (2013.01)

(58) Field of Classification Search
CPC ............ A61B 17/1757; A61B 90/11; A61B 2034/2055; A61B 17/1671; A61B 34/20; A61F 2/4455; A61F 2/4611; A61F 2002/30593
See application file for complete search history.

(56) References Cited

U.S. PATENT DOCUMENTS

| | | | |
|---|---|---|---|
| 9,681,919 B2 | 6/2017 | Glossop | |
| 2005/0075644 A1 | 4/2005 | Dipoto et al. | |
| 2005/0273167 A1* | 12/2005 | Triplett | ........ A61B 90/94 623/17.11 |
| 2007/0173832 A1* | 7/2007 | Tebbe | ........ A61B 17/7065 606/279 |
| 2010/0317991 A1* | 12/2010 | Leimbach | ........ A61B 90/11 600/562 |

(Continued)

FOREIGN PATENT DOCUMENTS

WO 2020002067 A1 1/2020

OTHER PUBLICATIONS

International Search Report and Written Opinion received in International Application No. PCT/US2021/032536, mailed on Aug. 31, 2021, 11 pages.

(Continued)

*Primary Examiner* — Nicholas J Plionis
(74) *Attorney, Agent, or Firm* — Adler Pollock & Sheehan P.C.

(57) ABSTRACT

A lumbar facetectomy guide includes a trajectory drill guide, a transforaminal rectangular cannula, and a stereotactic block, the stereotactic block including a first channel for receipt of the trajectory drill guide and a second channel for receipt of the transforaminal rectangular cannula.

5 Claims, 5 Drawing Sheets

(56) References Cited

U.S. PATENT DOCUMENTS

2012/0296359 A1\* 11/2012 Mire .................. A61B 17/3421
                                                                606/191
2013/0226187 A1    8/2013 Schaller et al.
2017/0065269 A1\* 3/2017 Thommen .............. A61B 1/012
2018/0271602 A1\* 9/2018 Frey .................... A61F 2/30942

OTHER PUBLICATIONS

Hardenbrook et al. "The Anatomic Rationale for Transforaminal Endoscopic Interbody Fusion: a Cadaveric Analysis", Neurosurg Focus, vol. 40, Issue 2, Feb. 2016, 4 pages.

\* cited by examiner

US 12,490,995 B2

LUMBAR FACETECTOMY GUIDE

CROSS REFERENCE TO RELATED APPLICATIONS

This application is a Continuation-in-Part of International Application No. PCT/US2021/032536 filed May 14, 2021, which claims priority from U.S. Provisional Patent Application No. 63/030,622 filed May 27, 2020, the entire contents of which are incorporated herein by reference.

BACKGROUND OF THE INVENTION

The present invention generally relates to medical devices, and more specifically to a lumbar facetectomy guide.

With the increase in life expectancy, the number of patients with spinal disease is on rise. Due to the increased patient age, surgeons now have to manage patients with increased medical co-morbidities such as lung, heart and kidney dysfunction. Consequently, more spinal surgeries are being performed as minimally invasive spine surgery. Moreover, endoscopic surgery is a subset of minimally invasive spine surgery that has been evolving rapidly and continuously to help manage older and sicker patients. Endoscopic surgery has advantages such minimal muscle and bone damage, less pain, early rehabilitation, reduced hospital stay and early return to work.

SUMMARY OF THE INVENTION

The following presents a simplified summary of the innovation in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

In general, in one aspect, the invention features a lumbar facetectomy guide including a trajectory drill guide, a transforaminal rectangular cannula, and a stereotactic block, the stereotactic block including a first channel for receipt of the trajectory drill guide and a second channel for receipt of the transforaminal rectangular cannula.

In another aspect, the invention features a lumbar facetectomy guide including trajectory drill guides, a transforaminal rectangular cannula, and a stereotactic block, the stereotactic block including a channels for receipt of each of the trajectory drill guides and the transforaminal rectangular cannula.

In still another aspect, the invention features a method including providing a lumbar facetectomy guide, the lumbar facetectomy guide including a trajectory drill guide, a transforaminal rectangular cannula, and a stereotactic block, the stereotactic block including a first channel for receipt of the a trajectory drill guide and a second channel for receipt of the transforaminal rectangular cannula, establishing placement of the transforaminal rectangular cannula, placing the stereotactic block on the transforaminal rectangular cannula, incising the skin where the trajectory drill guide will enter, using a beveled tip of the transforaminal rectangular cannula to dilate muscle down to facet bone, drilling down the trajectory drill guide to the transforaminal rectangular cannula, and placing an endoscope in the transforaminal rectangular cannula and inspecting.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

These and other features, aspects, and advantages of the present invention will become better understood with reference to the following description, appended claims, and accompanying drawings where:

DETAILED DESCRIPTION

Figure 1:
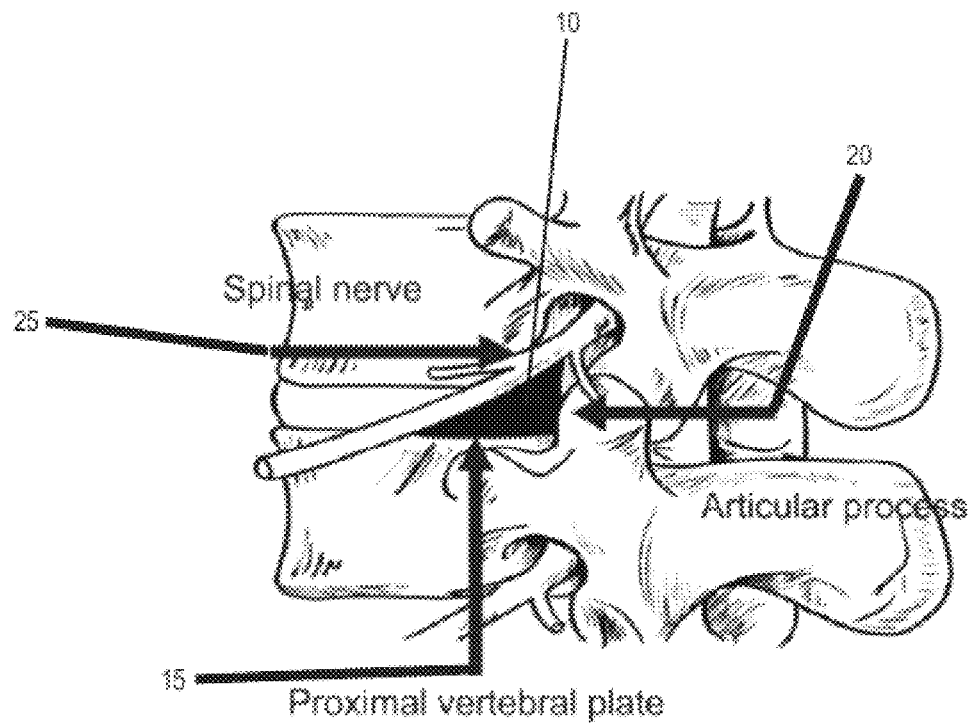
FIG. 1 illustrates an exemplary Kambin's triangle.

The subject innovation is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As shown in FIG. 1, Kambin's triangle 10 is a three-dimensional anatomic right triangle over the dorsolateral intervertebral disc of the lumbar spine. In a two-dimensional plane, the boundaries of the Kambin's triangle are the superior endplate of the inferior vertebral body (base of the triangle) 15, the superior articulating facet (the height of the triangle) 20, and the exiting superior nerve root (the hypotenuse of the triangle) 25.

Figure 2:
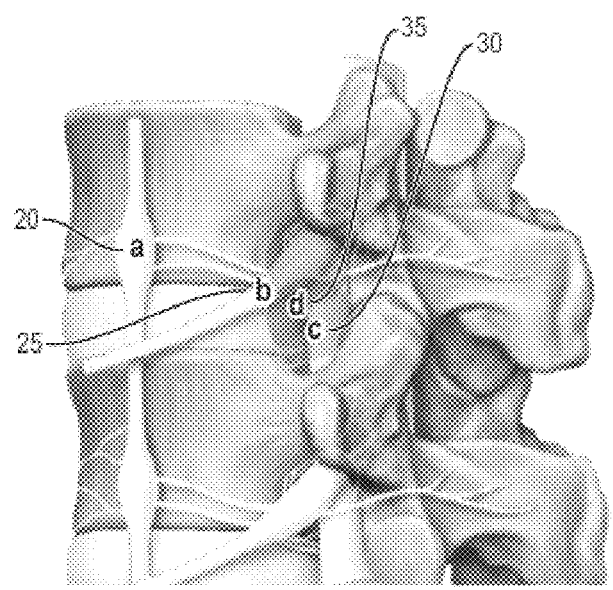
FIG. 2 illustrates exemplary endoscopic spinal surgery issues.

As shown in FIG. 2, prior to the present invention, endoscopic spinal surgery had limited surgical exposure and instruments due to neurological and anatomical barriers such as, for example, sympathetic trunk and ganglia 20, exiting nerve and ganglia 25, traversing nerve 30, and sinuvertebral nerves 35.

Figure 3:
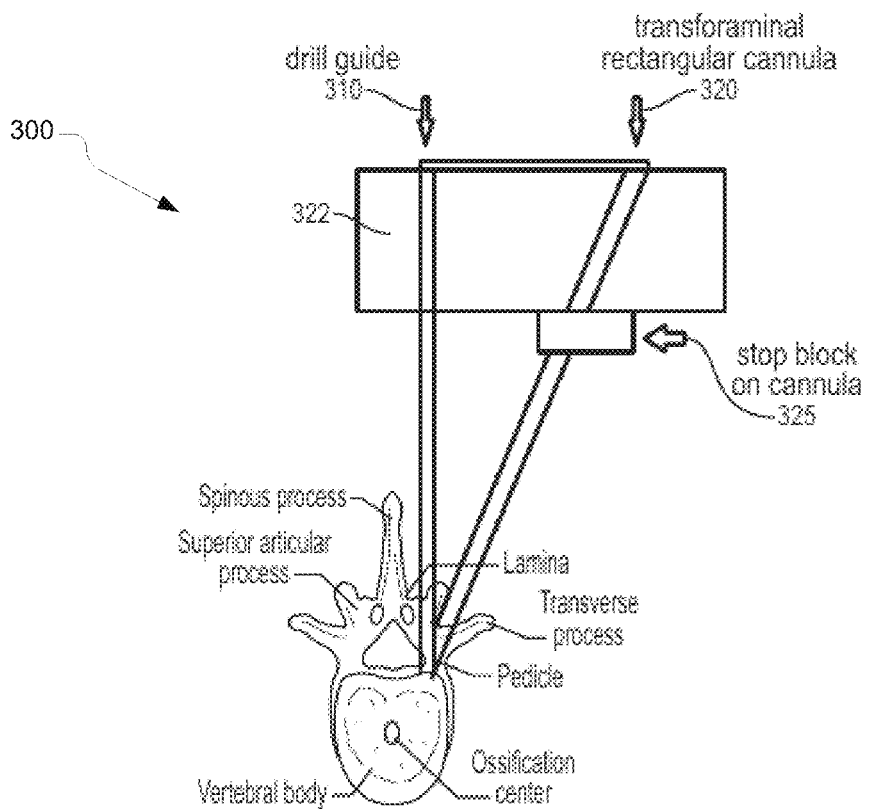
FIG. 3 illustrates a first embodiment of an exemplary lumbar facetectomy guide.

As shown in FIG. 3, an exemplary lumbar facetectomy guide 300 includes a trajectory drill guide 310, a transforaminal rectangular cannula 320, and a stereotactic block 322. The transforaminal rectangular cannula 320 includes a stop block 325. A stereotactic block 322 slides on the transforaminal rectangular cannula 320 and the trajectory drill guide 310 and positions them for lumbar facet bone removal, for example. Specifically, the stereotactic block 322 positions the trajectory drill guide 310 at an angle relative to the transforaminal rectangular cannula 320 to facilitate a removal of the lumbar facet bone that covers Kambin's triangle, which then facilitates a safe introduction of an expandable or static interbody cage(s) through the transforaminal rectangular cannula 320. When positioned within the stereotactic block 322 the block 322 prevents the trajectory drill guide 310 and the transforaminal rectangular cannula 320 from moving relative to each other.

Figure 4:
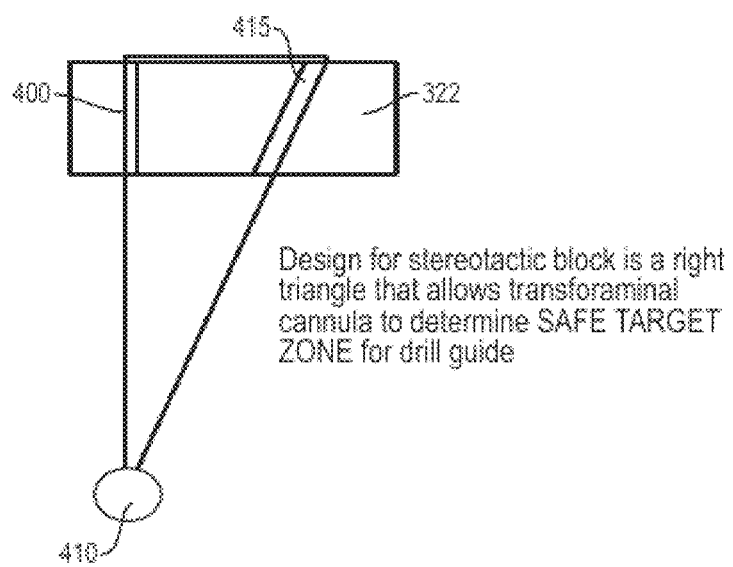
FIG. 4 illustrates a design of a stereotactic block.

As shown in FIG. 4, a design of the stereotactic block 322 is a right angle that allows a first channel 400 for the transforaminal rectangular cannula 320 to determine a safe target zone 410 for the trajectory drill guide 320 through a second channel 415.

Figure 5:
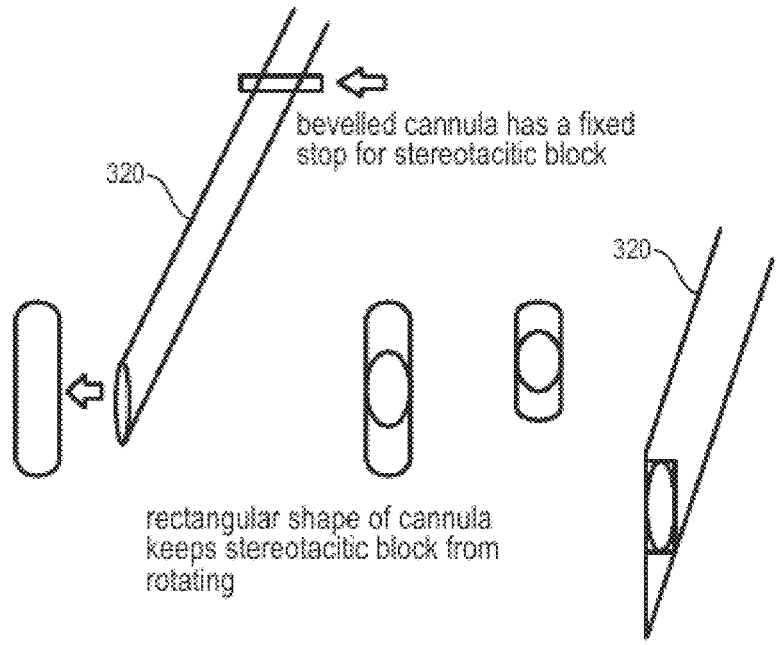
FIG. 5 illustrates a shape of a transforaminal rectangular cannula.

As shown in FIG. 5, a shape of the transforaminal rectangular cannula 320 is rectangular, which keeps the stereotactic block 322 from rotating.

The lumbar facetectomy guide 300 is used as follows. First, a surgeon establishes placement of the transforaminal rectangular cannula 320. The stereotactic block 322 is placed on the transforaminal rectangular cannula 320. Skin is incised where the trajectory drill guide 310 will enter. A beveled tip of the transforaminal rectangular cannula 320 is used to dilate muscle down to facet bone. The surgeon drills safely down the trajectory drill guide 310 to the transforaminal rectangular cannula 320. The surgeon places an endoscope in the transforaminal rectangular cannula 320 and inspects.

Figure 6:
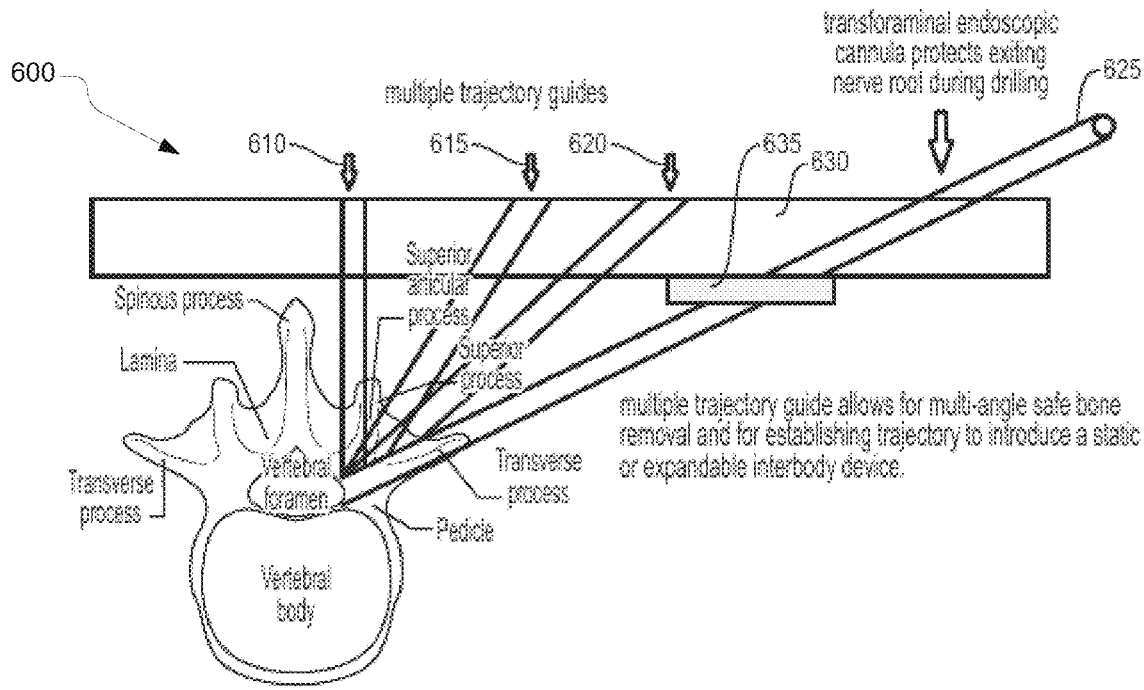
FIG. 6 illustrates a second embodiment of an exemplary lumbar facetectomy guide.

As shown in FIG. 6, another embodiment of an exemplary an exemplary lumbar facetectomy guide 600 includes multiple trajectory drill guides 610, 615, 620 and a transforaminal rectangular cannula 625 positioned through a stereotactic block 630. The transforaminal rectangular cannula 320 includes a stop block 635. In this embodiment, multiple trajectory drill guides 610, 615, 620 enable multi-angle safe bone removal and establishment of a trajectory to introduce a static or expandable interbody device.

Figure 7:
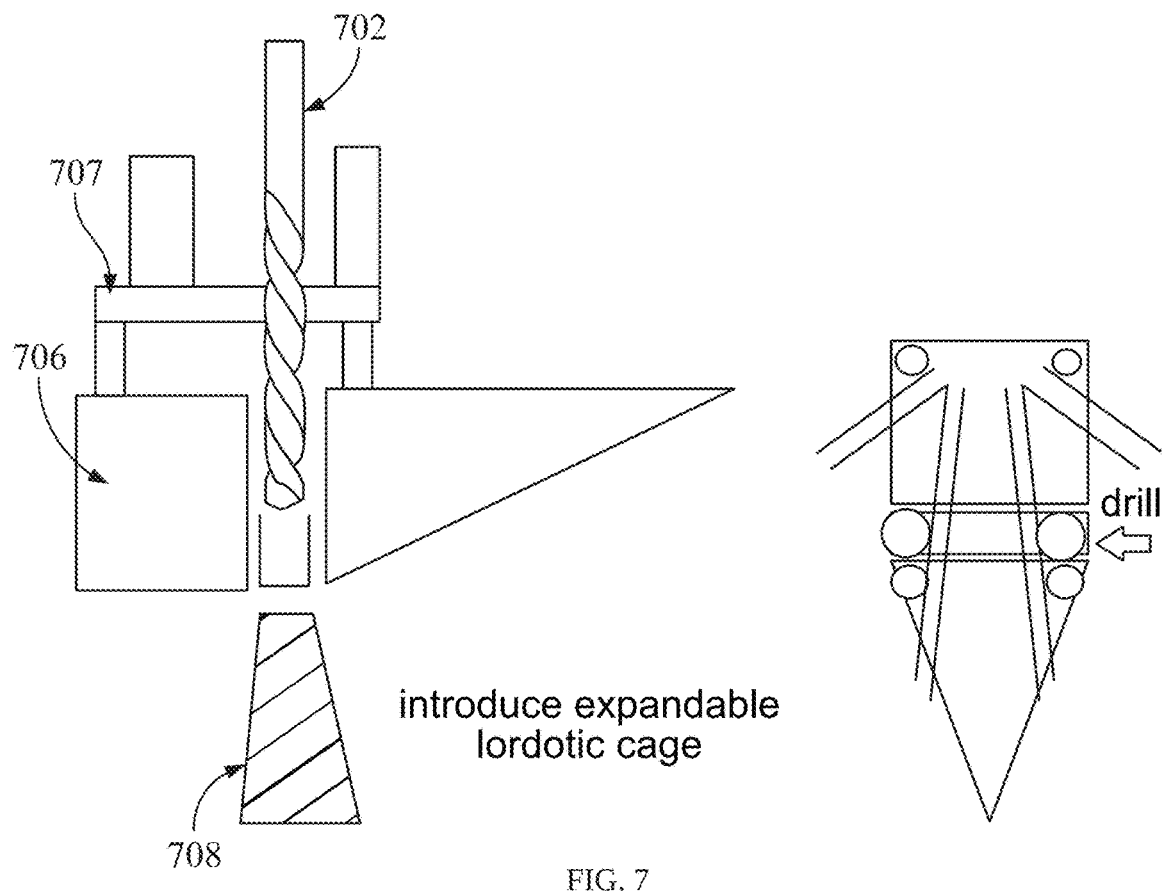
FIG. 7 illustrates a facet drill guide.

FIG. 7 illustrates how the facet drill guide 707 can be positioned in TLIF-Plif position 702 to remove facet bone over L5-S1 706 and introduce a lordotic cage 708.

Figure 8:
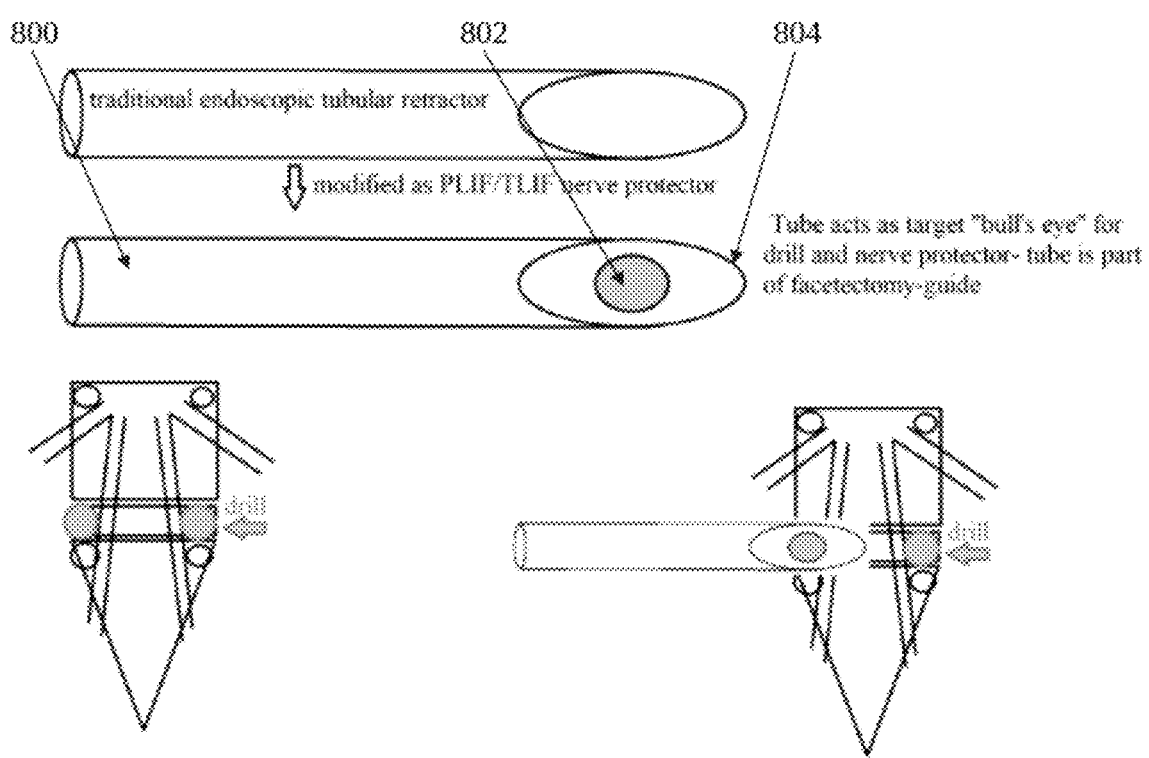
FIG. 8 illustrates an exemplary transforaminal tubular retractor.

In FIG. 8, an exemplary transforaminal tubular retractor 800 is shown with a "bull's eye" hole 802 in a tip 804 that acts as a target for a drill guide. Facet is removed with the drill and disc can be removed with the drill. The tubular retractor protects the exiting nerve root and enables direct visualization of both the exiting and traversing nerve roots with an endoscope during drilling.

Figure 9:
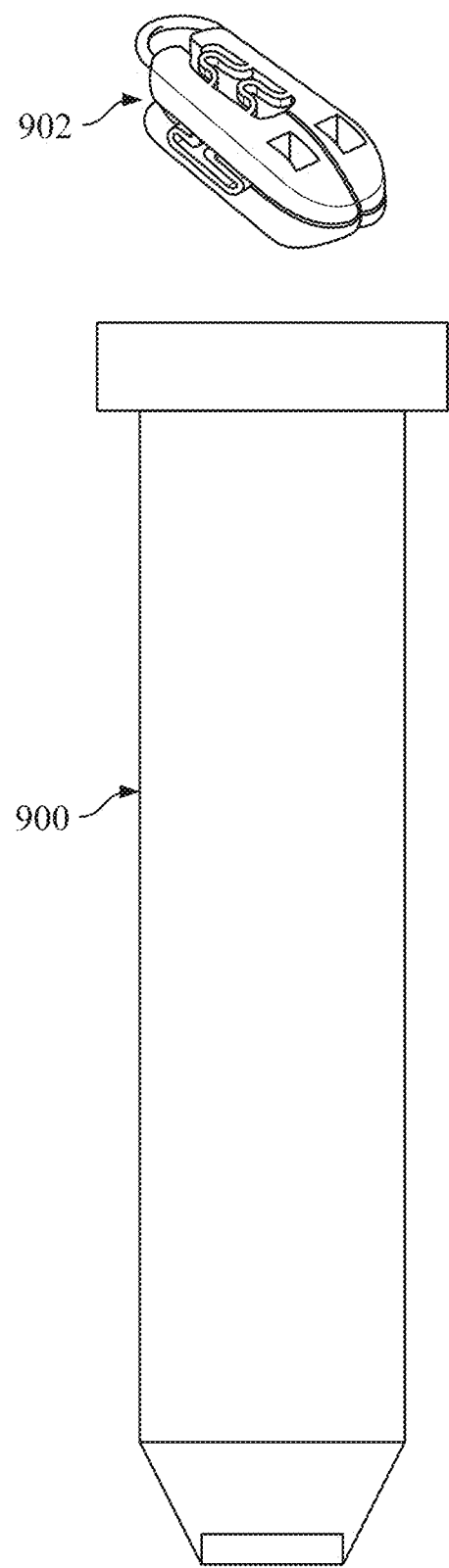
FIG. 9 illustrates a delivery tube.

FIG. 9 illustrates how the delivery tube 900 distracts endplates and retracts and protects exiting and traversing nerves for interbody cage 902 delivery.

In summary, in the embodiments described above, a drill guide slides onto a transforaminal cannula and targets a center of Kambin's triangle, while the transforaminal rectangular cannula and protects the exiting nerve. The more medial traversing nerve root is safely avoided by targeting lateral to the medial pedicle wall of the inferior vertebra. The technique described here enables the bone removal needed to introduce a transforaminal lumbar interbody fusion (TLIF) or posterior lumbar interbody fusion (PLIF) cage without over-retracting the exiting or traversing root. The dimensions of Kambin's triangle, with the facet bone removed, are sufficient to allow for passage of an interbody cage.

It would be appreciated by those skilled in the art that various changes and modifications can be made to the illustrated embodiments without departing from the spirit of the present invention. All such modifications and changes are intended to be within the scope of the present invention except as limited by the scope of the appended claims.

What is claimed is:

1. A method for performing a surgery on a subject, the method comprising:
    providing a lumbar facetectomy guide, the lumbar facetectomy guide comprising a plurality of trajectory drill guides, a transforaminal rectangular cannula, and a stereotactic block, the stereotactic block comprising a first channel for receipt of the transforaminal rectangular cannula and a plurality of second channels each for receipt of a respective one of the plurality of trajectory drill guides, the first and second channels intersecting at a substantially right angle;
    establishing placement of the transforaminal rectangular cannula lateral to a medial pedicle wall of an inferior vertebra;
    placing the stereotactic block on the transforaminal rectangular cannula;
    positioning one of the plurality of trajectory drill guides in a corresponding second channel such that the drill guide is orthogonal to the transforaminal rectangular cannula to facilitate removal of at least a portion of a lumbar facet bone that covers Kambin's triangle;
    incising an area on the subject's the skin where the one of the plurality of trajectory drill guides will enter;
    removing the at least portion of the lumbar facet bone via the one of the plurality of trajectory drill guides to enlarge Kambin's triangle;
    advancing, through the transforaminal rectangular cannula, an interbody cage selected from expandable and static cages into an intervertebral disc space in the subject that is made accessible by the enlarged Kambin's triangle,
    wherein the transforaminal rectangular cannula includes a stop block positioned against a bottom portion of the stereotactic block; and wherein the stereotactic block prevents the plurality of trajectory drill guides and the transforaminal rectangular cannula from moving relative to each other during the method.

2. The method of claim 1 further comprising using a beveled tip of the transforaminal rectangular cannula to dilate muscle down to facet bone.

3. The method of claim 2 wherein the beveled tip includes a bull's eye hole that acts as a target for the one of the plurality of trajectory drill guides.

4. The method of claim 3 further comprising drilling down the one of the plurality of trajectory drill guides to the transforaminal rectangular cannula.

5. The method of claim 4 further comprising placing an endoscope in the transforaminal rectangular cannula to enable direct visualization.

* * * * *